(12) United States Patent
Narayanan et al.

(10) Patent No.: US 10,193,790 B2
(45) Date of Patent: Jan. 29, 2019

(54) SYSTEMS AND METHODS FOR AN INTELLIGENT, DISTRIBUTED, AUTONOMOUS, AND SCALABLE RESOURCE DISCOVERY, MANAGEMENT, AND STITCHING

(71) Applicant: DELL PRODUCTS L.P., Round Rock, TX (US)

(72) Inventors: Rajesh Narayanan, San Jose, CA (US); YuLing Chen, Fremont, CA (US); Ke Xu, Santa Clara, CA (US)

(73) Assignee: DELL PRODUCTS LP, Round Rock, TX (US)

( * ) Notice: Subject to any disclaimer, the term of this patent is extended or adjusted under 35 U.S.C. 154(b) by 360 days.

(21) Appl. No.: 14/923,127

(22) Filed: Oct. 26, 2015

(65) Prior Publication Data

US 2017/0118082 A1    Apr. 27, 2017

(51) Int. Cl.
*H04L 29/08* (2006.01)
*H04L 12/733* (2013.01)
*H04L 12/911* (2013.01)
*H04L 12/24* (2006.01)

(52) U.S. Cl.
CPC .......... *H04L 45/122* (2013.01); *H04L 41/042* (2013.01); *H04L 47/74* (2013.01)

(58) Field of Classification Search
CPC ............................. H04L 41/12; H04L 45/122
See application file for complete search history.

(56) References Cited

PUBLICATIONS

Wikipedia, "Dynamic Source Routing," [online], [retrieved Feb. 17, 2016], Retrieved from Internet <URL: https://en.wikipedia.org/wiki/Dynamic_Source_Routing> (3 pages).

*Primary Examiner* — Adnan M Mirza
(74) *Attorney, Agent, or Firm* — North Weber & Baugh LLP

(57) ABSTRACT

Aspects of the present invention include employing a distributed, scalable, autonomous resource discovery, management, and stitching system. In embodiments of the present invention, intelligent distribution systems and methods are employed in an autonomous resource discovery, management, and stitching systems. In embodiments of the present invention a set of rules or parameters may be used to determine whether a request for resources should be forwarded to other nodes. In embodiments of the present invention, an intelligent distribution engine selects the node to be used when more than one database instance can fulfill a request.

19 Claims, 11 Drawing Sheets

SYSTEMS AND METHODS FOR AN INTELLIGENT, DISTRIBUTED, AUTONOMOUS, AND SCALABLE RESOURCE DISCOVERY, MANAGEMENT, AND STITCHING

BACKGROUND

Field of Invention

The present invention relates generally to networks and devices, and relates more particularly to intelligent, distributed, scalable, and autonomous resource discovery, management, and stitching in compute, storage and networking environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems provide increasingly more central and critical operations in modern society, it is important that the networks are reliable. One method used to improve reliability is to provide a centralized network management.

One type of information handing system is a large-scale datacenter or multiple cloud clusters. In a large-scale datacenter or multiple cloud clusters, control and management is a difficult task. Control and management includes resource discovery, reservation, monitoring, maintenance, teardown, etc. Centralized control of federation between different aggregate managers is a popular method, for example global environment for network innovations (GENI) deployment. However, such mechanism requires additional external infrastructure. This architecture is not able to scale infinitely due to the computing and access limitations of the control infrastructure. Furthermore, cloud infrastructure, e.g., OpenStack, itself does not address and solve this scalability issue when controlling thousands of nodes in a data center.

FIG. 1 depicts a block diagram of centralized management structure according to prior art embodiments. FIG. 1 shows a datacenter or cloud infrastructure 120 including a plurality of racks 130, 140, 150, 160, 170, 180, and 190. Within this infrastructure there can be a plurality of customers, for example, as shown in FIG. 1, customer 1 192 and customer 2 194. Each customer 192 and 194 can rent space in the data center. For example, customer 1 192 can rent infrastructure 174 and infrastructure 182 and customer 2 194 can rent infrastructure 172 and 184. In the prior art system shown in FIG. 1 a central management 110 is used. Central management performs all the monitoring, resource discovery, resource allocation, maintenance, etc. in the entire datacenter structure 120 including all racks 130, 140, 150, 160, 170, 180, and 190. Having a central management 110 is limiting in the sense that there is a finite, fixed number of racks that can be added to a central management 110. Therefore, the central management system has inherent scalability and manageability limitations.

Accordingly, what is needed is to solve this scalability issue, enabling extending from ten nodes to a million nodes.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the spirit and scope of the invention to these particular embodiments. These drawings shall in no way limit any changes in form and detail that may be made to the invention by one skilled in the art without departing from the spirit and scope of the invention.

DETAILED DESCRIPTION OF THE PREFERRED EMBODIMENTS

Figure 1:
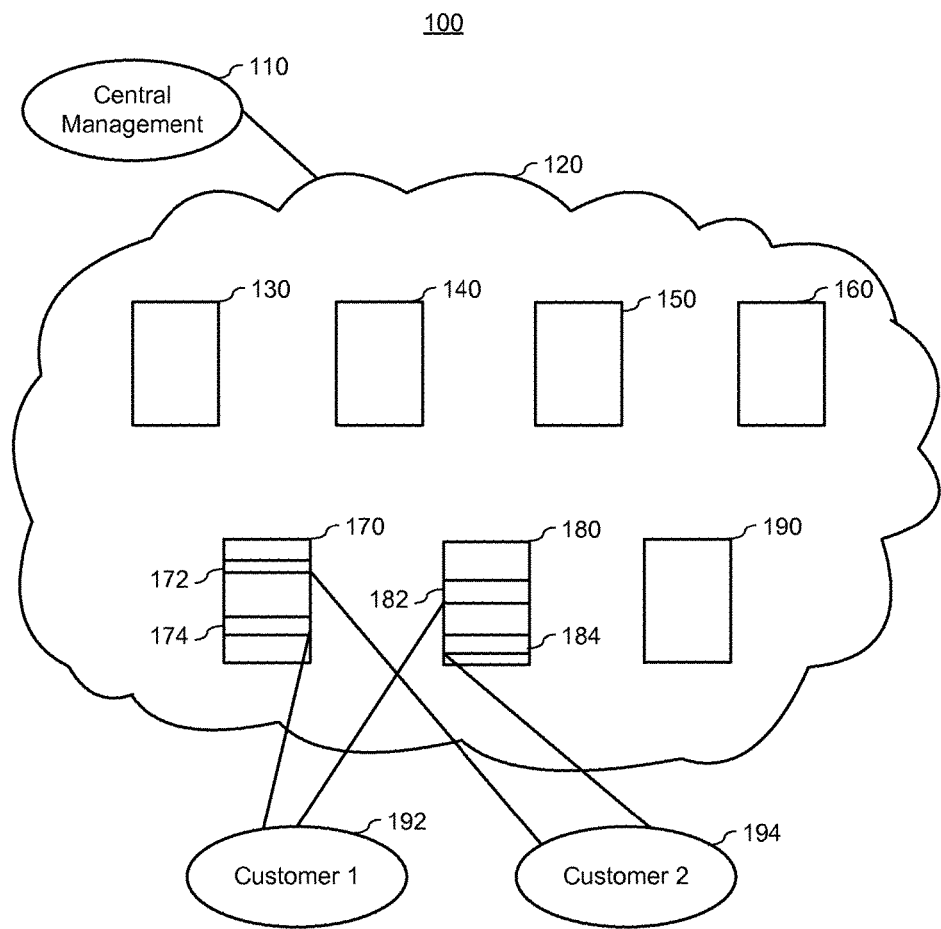
FIG. 1 depicts a block diagram of centralized management structure according to prior art embodiments.

In the following description, for purposes of explanation, specific examples and details are set forth in order to provide an understanding of the invention. It will be apparent, however, to one skilled in the art that the invention may be practiced without these details. Well known process steps may not be described in detail in order to avoid unnecessarily obscuring the present invention. Other applications are possible, such that the following examples should not be taken as limiting. Furthermore, one skilled in the art will recognize that aspects of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components (which may or may not be shown in the figure). Also, additional or fewer connections may be used. It shall also be noted that the terms "coupled" or "communicatively coupled" shall be understood to include direct connections, indirect connections through one or more intermediary devices, and wireless connections.

In the detailed description provided herein, references are made to the accompanying figures, which form a part of the description and in which are shown, by way of illustration, specific embodiments of the present invention. Although these embodiments are described in sufficient detail to enable one skilled in the art to practice the invention, it shall be understood that these examples are not limiting, such that other embodiments may be used, and changes may be made without departing from the spirit and scope of the invention.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments. It shall be noted that the use of the terms "set" and "group" in this patent document shall include any number of elements. Furthermore, it shall be noted that methods or algorithms steps may not be limited to the specific order set forth herein; rather, one skilled in the art shall recognize, in some embodiments, that more or fewer steps may be performed, that certain steps may optionally be performed, and that steps may be performed in different orders, including being done some steps being done concurrently.

The present invention relates in various embodiments to devices, systems, methods, and instructions stored on one or more non-transitory computer-readable media involving the communication of data over networks. Such devices, systems, methods, and instructions stored on one or more non-transitory computer-readable media may result in, among other advantages, the ability to manage networks at a datacenter or cloud infrastructure level.

It shall also be noted that although embodiments described herein may be within the context of management in a network device, the invention elements of the current patent document are not so limited. Accordingly, the invention elements may be applied or adapted for use in other contexts.

Some embodiments described herein decentralize management across a network. A network may be any network of nodes including a cloud block network, a power grid, smart cars, a gaming system, any compute environment collection of nodes, any networking collection of nodes, and any storage collection of nodes.

As used herein, a node comprises a management/controller, an autonomous resource discovery, management, and stitching module, and at least one resource. A network comprises a plurality of nodes having physical or virtual connections between and among the various nodes. By way of having physical or virtual connections, the nodes have relationships to each other. For example, a neighbor node is a node that is directly reachable by physical or virtual connection to another node.

The nodes each have their own management/controller and are managed independently of each other. Two nodes do not have to have the same type of management or be running the same version of software. The network is also decentralized such that one node does not control or manage any other node. As such, no node has any visibility into available resources or management of resources on any other node.

Figure 2:
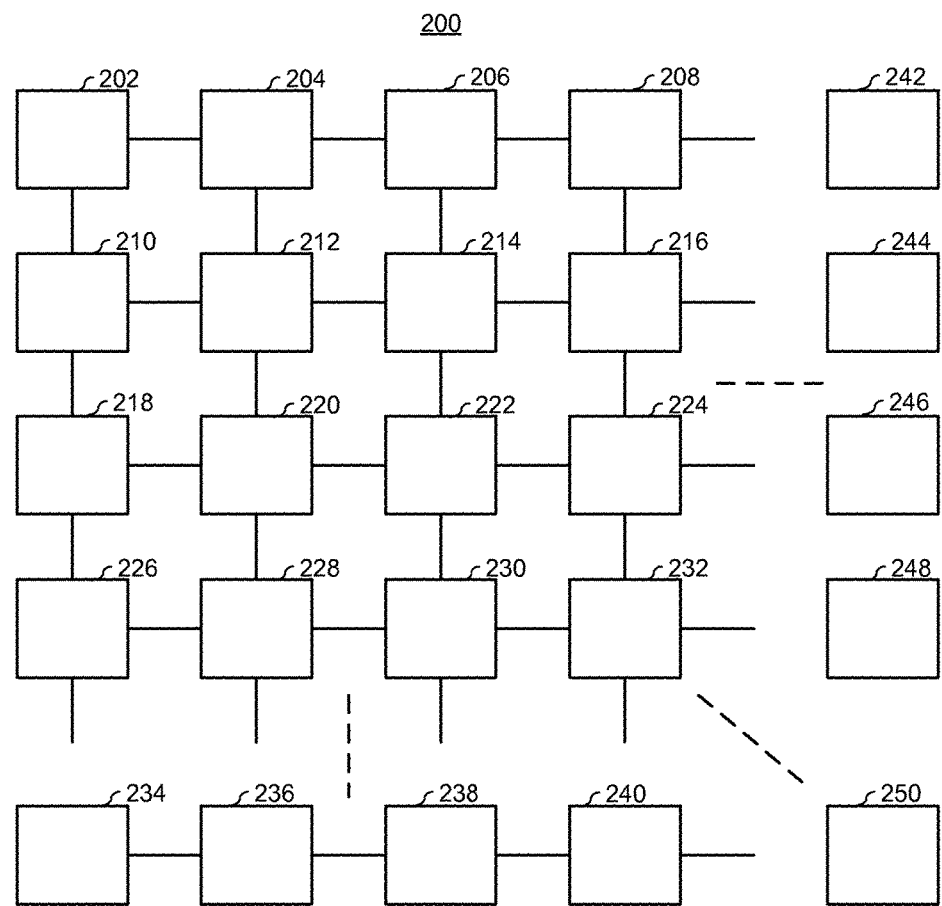
FIG. 2 depicts a block diagram of an intelligent, distributed, autonomous resource discovery, management, and stitching system according to embodiments in this patent document.

FIG. 2 depicts a block diagram of an intelligent, distributed, autonomous resource discovery, management, and stitching system according to embodiments in this patent document. FIG. 2 shows a plurality of nodes of an autonomous resource discovery, management, and stitching system 200.

In some embodiments, each node has an autonomous resource discovery, management, and stitching system for managing the resources within the node, but without direct management of the resources in other nodes. In some embodiments, each node comprises a management/controller for management and control of resources within that node only, an autonomous resource discovery, management, and stitching module, and at least one resource. Nodes will be more described below with reference to FIG. 8.

FIG. 2 shows nodes 202, 204, 206, 208, 210, 212, 214, 216, 218, 220, 222, 224, 226, 228, 230, 232, 234, 236, 238, 240, 242, 244, 246, 248, and 250. FIG. 2 shows a grid of nodes organized into columns and rows, where nodes 202, 204, 206, 208 and 242 are in the first row and node 242 is the Nth node in the row. FIG. 2 also shows a first column made up of nodes 202, 210, 218, 226, and 234, where 234 is the Mth node in the column. Nodes 204, 212, 220, 228, and 236 make up the second column. Nodes 206, 214, 222, 230, and 238 make up the third column. Nodes 208, 216, 224, 232 and 240 make up the fourth column. Nodes 242, 244, 246, 250 and 252 make up the Nth column. Nodes 210, 212, 214, 216, and 244 make up the second row. Nodes 218, 220, 222, 224, and 246 make up the third row. Nodes 226, 228, 230, 232, and 248 make up the fourth row. Nodes 234, 236, 238, 1240 and 250 make up the Mth row. However, one of ordinary skill in the art will understand, this grid configuration and the number of nodes shows is for illustration only. Any number of nodes and any configuration may be used.

Using the example shown in FIG. 2, if a node requires a resource that is not available locally, the node may use a resource at another node without having a centralized management over that node or that resource. For example, if node 212 requires a resource that is not available locally within node 212, node 212 may use a resource at one of the other nodes. In that scenario, node 212 is an originating node and may originate a message, which is a request for a resource. In some embodiments, there are two components to the request message. One component may be the resource requested. The second component may be instructions on how to propagate the message to the other nodes.

In some embodiments, the message is propagated to each neighbor node of the originating node and each neighbor node propagates the message to each of its neighbor nodes, and so on until the requested resource is located.

In some embodiments, once a node has determined that the node can satisfy the request for the resource that node becomes the fulfilling node and responds back that the fulfilling node will fulfill the request. In some embodiments, that response back follows the same path back to the originating node that was taken to reach the fulfilling node.

For example, if node 212 is the originating node and requires a resource such as one terabyte of storage space, node 212 may send a request message out to its neighbor nodes, nodes 204, 214, 220, and 210. Each of nodes 204, 214, 220, and 210 may evaluate whether each node can fulfill the request. If none of nodes 204, 214, 220, and 210 can fulfill the request, then each of nodes 204, 214, 220, and 210 may forward the request to each neighbor node.

In the example shown in FIG. 2, node 204 may forward the request message to nodes 202 and 206. Node 204 may not send the message to node 212 since the message came to node 204 by way of node 212. Node 214 may forward the message request to nodes 206, 216, and 222. Similarly, node 214 may not send the message to node 212 since the message came to node 214 by way of node 212. Node 220 may forward the message to nodes 222, 228, and 218. Similarly, node 220 may not send the message to node 212 since the message came to node 220 by way of node 212. Node 210 may forward the message to nodes 202 and 218. Similarly, node 210 may not send the message to node 212 since the message came to node 210 by way of node 212.

By way of example, if node 228 can satisfy the request, then node 228 may respond back to node 220 that node 228 can fulfill the request. Node 220 may forward the request back to node 212 that node 228 can fulfill the request.

In some embodiments, each node has a storage to maintain a log in a table. The log includes at least a listing of messages received, the neighbor node or nodes who sent the message, and the neighbor node or nodes who were forwarded the message. The table permits a node to the request forward the message to its neighbors and to forward a reply back message back to the originating node. In the example above, node 204 may store information about the message received from node 212, including the content of the message and that it was received from node 212 and that the message was forwarded to nodes 202 and 206. Also, node 214 may store information about the message received from node 212, including the content of the message and that it was received from node 212 and that the message was forwarded to nodes 206, 216, and 222. Node 220 may store information about the message received from node 212, including the content of the message and that it was received from node 212 and that the message was forwarded to nodes 222, 228, and 218. Node 210 may store information about the message received from node 212, including the content of the message and that it was received from node 212 and that the message was forwarded to nodes 202 and 218.

In some embodiments, each node has a storage to maintain historical information related to success of fulfilling nodes. In the example above, node 212 may store information about a success of fulfilling a resource request from the direction of its neighbor, node 220. The success may have come from node 220 or another node that received the request message forwarded through node 220.

In some embodiments, the originating node determines a plan to discover resources. In some embodiments, the originating node may use a heuristics/analytics module to use the information stored about successes to determine a plan other than to send the message request to all of its neighbors and those neighbor nodes forward the request to all if their neighbors, etc. In the example above, node 212 may send the request message to only nodes 204 and 214. Each of those nodes may only send the request message to one neighbor node as well. Alternatively, node 214 may only forward the request to nodes 206 and 222, depending on the hop count limits sent with the message request.

As will be evident to one of ordinary skill in the art, in some embodiments other efficient algorithms may be used to conserve network bandwidth, processing, and storage at each node. In some embodiments, the determined plan at the originating node is to send the message request only to the originating node's neighbors, but not forward any further. If one of the neighbors can satisfy the request, then the originating node does not need to look any further.

If none of the neighbors can satisfy the request, then the originating node may determine a different plan. For example, the originating node may use a notion of tokens to propagate the message request. In one example, the originating node may use two tokens. In that example, the originating node may elect to send one of its tokens to the neighbor that has had recent successes. The other token may be sent out randomly or may be used to the neighbor with the second most recent successes. Once passed to the neighbor node, the neighbor node has that token to pass to one of its neighbor nodes, if the neighbor node cannot satisfy the request.

Any algorithm may be used to determine recent successes. For example, a time period may be set, e.g., 2 minutes, and the number of successes calculated during that time period. In other embodiments, a more complex algorithm may be used taking into consideration time of day, number of successes, number of recent success, type of resources, and any other parameter.

In some embodiments, where node 212 is the originating node a second time, following the previous example. In this example, the resources requested are compute resources. Node 212 may elect to send out the request to each of its neighbor nodes, nodes 204, 214, 220, and 210. Each node 204, 214, 220, and 210 responds back that each node cannot satisfy the request. Originating node 212 may then elect to send out the request via one token to node 220 only since node 220 had a success previously. In this example, node 220 cannot satisfy the request. Node 220 elects to forward the request and token to only one neighbor, since only one token was used, to node 228. Node 228 cannot satisfy the request. Node 228 forwards the request and one token to one neighbor. Node 228 forwards the request to node 226. Node 226 responds that it can satisfy the request and becomes the fulfilling node.

The response that node 226 sends is referred to herein as a reply or a reply message. A reply includes the stitching information, e.g., a network identifier or virtual extensible local area network identifier (VNI or VxLAN ID). Node 226 replies to node 228 that node 226 can satisfy the request. Node 228 forwards the reply to node 220 using the table in node 228 to refer to the message request to determine to forward the reply to node 220. Node 220, likewise, forwards the reply to node 212 and includes information about its path including its own a network identifier or VNI or VxLAN ID. Node 212 updates its heuristics/analytics to include a success from the direction of neighbor node 220.

In some embodiments, an intelligent distribution function is used to set rules for request message propagation. An intelligent distribution function is a set of rules that specifies how the message propagates. For example, an intelligent distribution function may implement a set of rules for dropping a request for resources and a set of rules for selection from among more than one response indicating that the resource request can be fulfilled. An intelligent distribution function may be implemented in an intelligent distribution engine.

In some embodiments, the intelligent distribution function is set by the originating node. The intelligent distribution function may be used to implement a set of rules for dropping a request for resources. In some embodiments, an originating node may include certain parameters for its request message. For example, the originating node may set a hop count limit, bandwidth limit, or latency limit associated with the resource request. The originating node may send the request to neighbor nodes in accordance with a determined plan. Each receiving node may reply that it can satisfy the request, forward the request, or drop the request after checking the parameters set with the request.

The request for resources message may include the listing of resource or resources requested, token information, and an intelligent distribution function. A receiving node analyzes the request for resources to determine if the receiving node has the available resources to satisfy the request. The receiving node may also update its log with information about the request. The receiving node inserts its own information, for example, decrements the hop count by one in the request. In some embodiments, the receiving node makes a determination on whether to forward or drop the request if after decrementing the hop-count value becomes ZERO. In some embodiments, other parameters in the request can determine whether the receiving node forwards drops the request. In some embodiments, other parameters in the request impact whether the receiving node forwards the request to all of its neighbors, excluding the neighbor from where it received the request or a subset of those neighbors. In some embodiments the receiving node may or may not respond with a failure response to the requesting node, so that subsequent but different requests from the same neighbor could apply a different set of rules.

On the reply, the fulfilling node replies that the fulfilling node can satisfy the request and includes resource stitching information. The forwarding node or nodes also append resource stitching information to the reply and forward it to the node that sent the forwarding node the request message. This process continues until the reply message reaches the originating node.

For example, if the originating node set a hop count limitation of four, the intelligent distribution engine in the first receiving node will forward the request, if it cannot satisfy the request, and decrease the hop count by one with the forwarded message. When a receiving node receives a request and information the hop count is zero, then the intelligent distribution engine in that node will drop the request, if it cannot satisfy the request. If that receiving node forwarded the request, the hop count limit would be exceeded, so that receiving node drops the request.

In the embodiment shown in FIG. 2, if node 214 is the originating node and requests compute resources with a hop count limit of two, then node 214 will send a request to each neighbor node, nodes 206, 212, 222, and 216. Each of nodes 206, 212, 222, and 216 will evaluate whether each node can satisfy the request from node 214. In this example, none of nodes 206, 212, 222, and 216 can satisfy the request. Then each of nodes 206, 212, 222, and 216 may either drop the request or forward the request. The intelligent distribution engine in each of nodes 206, 212, 222, and 216 makes the decision whether to drop or forward the request based on the parameters sent with the request. In this example, the parameters are a hop count limit of two and the information that there has only been one hop. Since the hop count limit has not been met, each of nodes 206, 212, 222, and 216 will forward the request to each of the neighbor nodes along with information that there has been one hop.

In this example, node 212 will forward the request to nodes 204, 210, and 220. Each of nodes 204, 210, and 220 will evaluate whether it can satisfy the request. If the node can satisfy the request, it will send back a message to node 212. The message may indicate that a node can satisfy the request and include resource stitching information. Node 212 will append resource stitching information and forward the message to originating node 214. If, for example, nodes 210 and 204 can both satisfy the request, each node will send a message to node 212 to forward to originating node 214. If node 220 cannot satisfy the request, its intelligent distribution engine makes a decision of whether to drop the request or forward it. In this example, the hop count limit of two will be exceeded if node 220 forwards the request. Therefore, node 220 will drop the request instead of forwarding it.

In this example, nodes 206, 222, and 216 will all also forward the request and each of the nodes that receive the request from nodes 206, 222, and 216 will also evaluate whether each node can satisfy the request and if not, whether to forward or drop the request. This example is for illustration only. Any node may be the originating node and any set of resources or parameters may be used. In some embodiments, sending a request message to all neighbors, rather than a more limited number of neighbors, but limiting the hop count is another determined plan available to the originating node if the neighbors cannot satisfy the originating node's request.

In some embodiments, the intelligent distribution function is also used to implement a set of rules for selection from among more than one response that the resource request can be fulfilled. The intelligent distribution engine may be used to set up criteria for selection from among a number of responses to an originating node. The originating node can set up this criteria. For example, the criteria may be to use the largest disk space, lowest memory, lowest CPU utilization, largest network bandwidth, or the combination of different such metrics with formula. The criteria may be used to generate a ranking of responses. For example, if the criteria is to select the response with the greatest memory, then the response will be ranked based on available memory. In some embodiments, the criteria may be a combination of factors used to generate the ranking. With the ranking result, the requesting node may pick the remote node with the highest rank and use the node with the highest rank.

In embodiments of the present invention, the nodes may be compute, storage, networking, file system, individual files, scalabilities of devices, sensors, services, database, smart grid, power management, power charging, sensors, electric vehicles, or any other resource.

Figure 3:
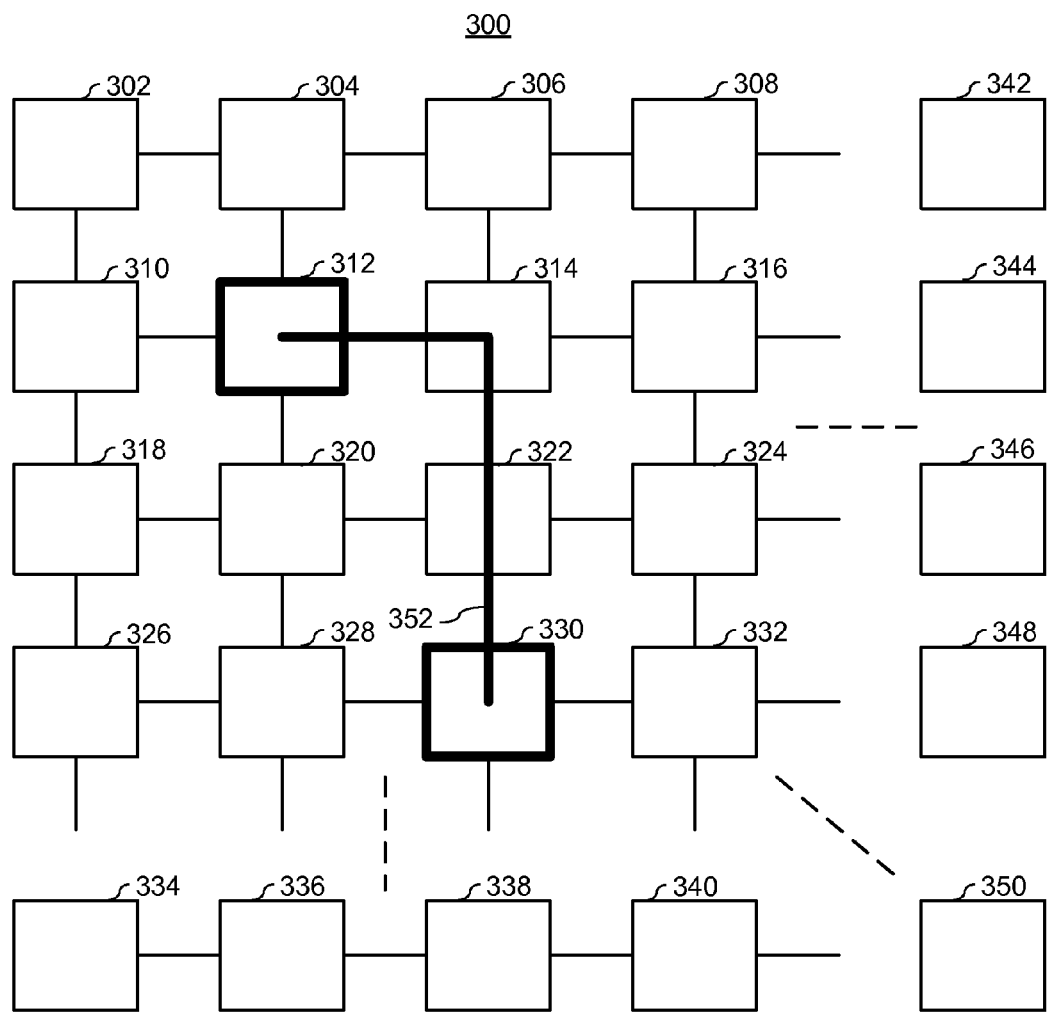
FIG. 3 depicts another block diagram of an intelligent, distributed, autonomous resource discovery, management, and stitching system according to embodiments in this patent document.

FIG. 3 depicts another block diagram of an intelligent, distributed, autonomous resource discovery, management, and stitching system according to embodiments in this patent document. FIG. 3 is similar to FIG. 2 in that it shows a grid network configuration of nodes including nodes 302, 304, 306, 308, 310, 312, 314, 316, 318, 320, 322, 324, 326, 328, 330, 332, 334, 336, 338, 340, 342, 344, 346, 348, and 350. FIG. 3 depicts an N by M matrix, however, the nodes may be in any network configuration. FIG. 3 also shows bolded nodes 312 and 330 and path 352 between nodes 312 and 330. FIG. 3 shows an example where node 312 is the requesting node. Node 312 has sent a request for resources to node 314. Node 314 cannot satisfy the request and has forwarded the request to node 322. Node 322 cannot satisfy the request so node 322 has forwarded the request to node 330. Node 330 can satisfy the request. So node 330 replies to node 322 that it can satisfy the request. Node 322 looks up the request in the table in node 322 and recognizes that this request was sent from node 314 so node 322 forwards the reply to node 314. Node 314 looks up in the table in node 314 and recognizes that the request came from node 312. Node 314 forwards the reply to node 312. Node 312 recognizes itself as the originating node. Node 312 initiates a stitching of resources along the path 352.

Resource stitching may be accomplished using a resource stitching engine. In some embodiments, resource stitching is network stitching between resources assigned across multiple nodes. Once an originating node assigns a resource from a fulfilling node, the fulfilling node will reply that to the requesting node by way of forwarding nodes, including the stitching information, e.g., a network identifier or virtual extensible local area network identifier (VNI or VxLAN ID). Each forwarding node also appends its own stitching information, e.g., a network identifier or VNI or VxLAN ID. After the originating node receives the reply, the originating node may assign any necessary resources according to the stitching information. After stitching, seamless resource access and control is achieved. In some embodiments, the resources assigned from fulfilling nodes perform as if they are local resources to the originating node, from the perspective of the originating node. A main difference between a local resource at the originating node and a remote resource (on a fulfilling node) is that the originating node controller does not have the ability to directly manage resources on the fulfilling node.

The system disclosed with reference to FIG. 2, permits use of resources across nodes without the use of a centralized management. No node has any management of resources at any other node. However, by way of resource discovery, assignment, and stitching, an originating node may use resources at a fulfilling node as if the resources were available at the originating node.

In the example depicted in FIG. 3, originating node 312 stitches resources with fulfilling node 330 by way of path 352. Originating node 312 uses the stitched resources at fulfilling node 330 as if the resources were local the originating node 312.

Figure 4:
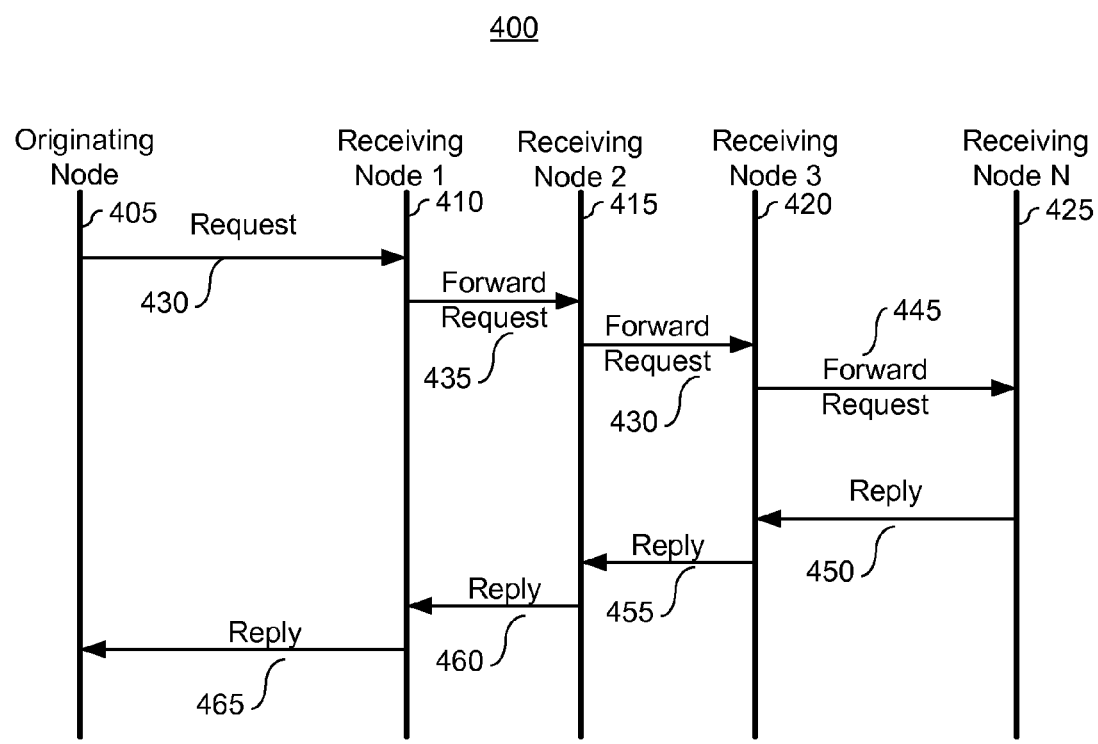
FIG. 4 depicts a message sequence chart according to embodiments in this patent document.

FIG. 4 depicts a message sequence chart according to embodiments in this patent document. FIG. 4 illustrates the message sequences described above with respect to FIGS. 2 and 3 where a node can satisfy the request and becomes the fulfilling node. FIG. 4 shows originating node shown on line 405. Originating node issues a request for resources 430. The request is sent to receiving node one 410. In the example shown in FIG. 4 there are N receiving nodes. However, one of ordinary skill in the art will recognize that N may be any number, even a number less than three.

Receiving node one 410 forwards the request 435 to receiving node two 415. Receiving node two 415 forwards the request 430 to receiving node three 420. Receiving node three 420 forwards the request 445 to receiving node N 425.

In the embodiment shown in FIG. 4, receiving node N 425 can satisfy the request and is the fulfilling node. Receiving node N 425 sends a reply 450 back to receiving node three 420 that sent receiving node N 425 the request. Receiving node three 420 forwards the reply 455 to receiving node two 415. Receiving node two 415 forwards the reply 460 to receiving node one 410. Receiving node one 410 forwards the reply 465 to originating node 405.

Each time the request is forwarded, the request is forwarded consistent with the intelligent distribution function and each forwarding node, receiving node one 410, receiving node two 415, and receiving node three 420 in FIG. 4, add any relevant information to the request, e.g., increase hop count by one. Each forwarding node also updates its log with respect to the request.

Figure 5:
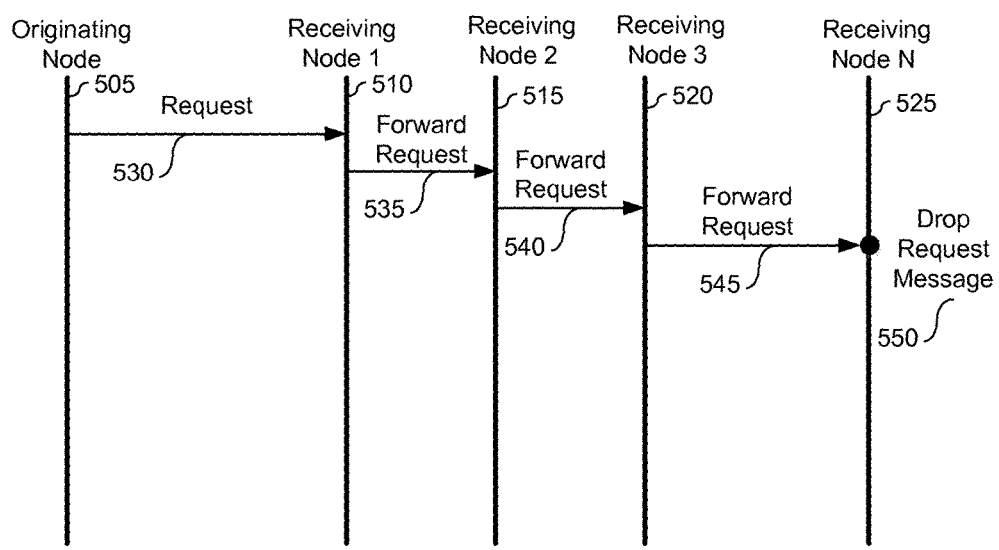
FIG. 5 depicts another message sequence chart according to embodiments in this patent document.

FIG. 5 depicts another message sequence chart according to embodiments in this patent document. FIG. 5 illustrates the message sequences described above with respect to FIGS. 2 and 3 where a request message is dropped consistent with the intelligent distribution function. FIG. 5 shows originating node 505 sending a request message 530 to receiving node one 510. Receiving node one 510 cannot satisfy the request so receiving node one 510 forwards the request 535 to receiving node two 515. Receiving node two 515 cannot satisfy the request so receiving node two 515 forwards the request 540 to receiving node three 520. Receiving node three 520 cannot satisfy the request so receiving node three forwards the request 545 to receiving node N 525. Receiving node N 525 cannot satisfy the request, but if receiving node N 525 forwarded the request the hop count in the intelligent distribution function would be exceeded so receiving node N 525 drops the request 550. In the example shown in FIG. 5 there are N receiving nodes. However, one of ordinary skill in the art will recognize that N may be any number, even a number less than three.

Figure 6:
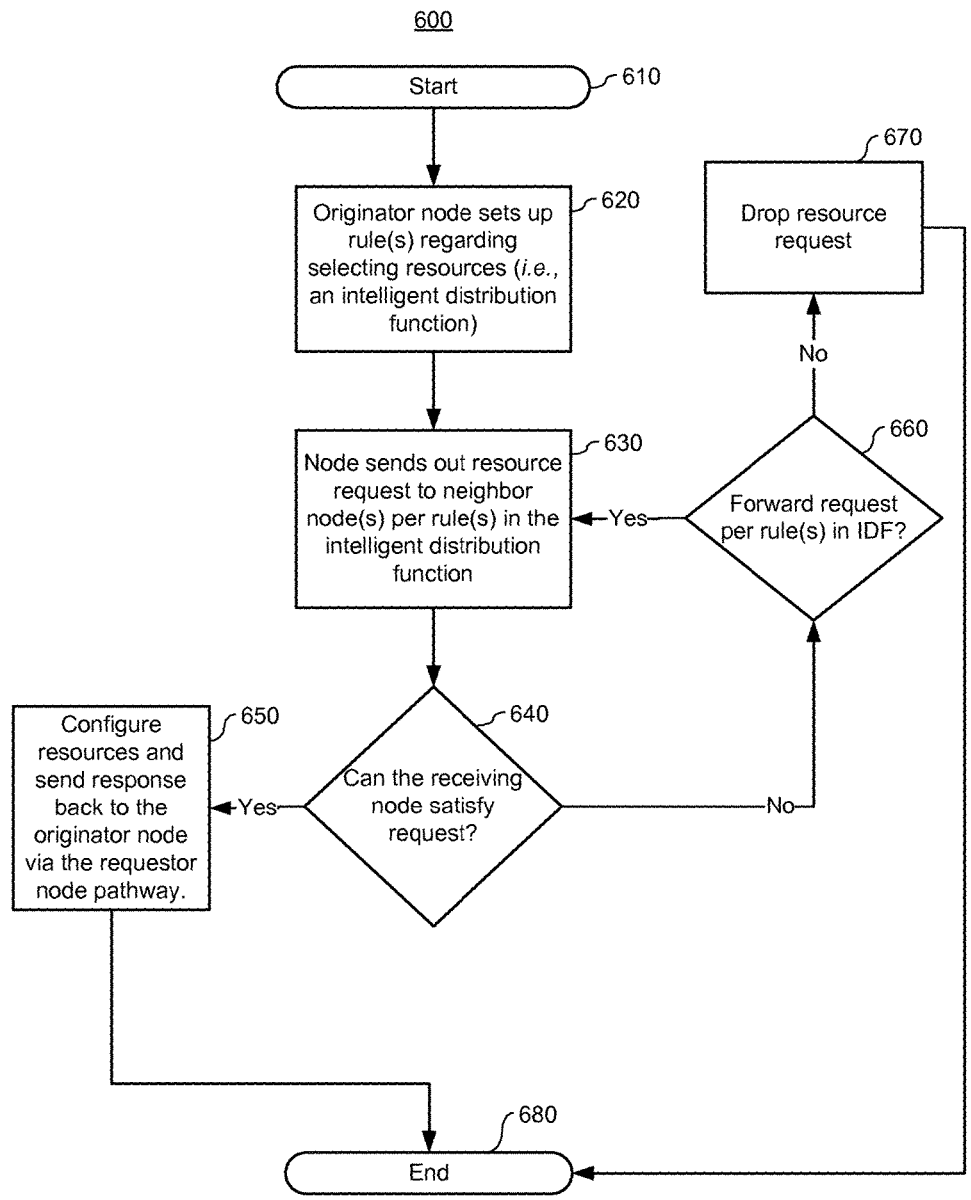
FIG. 6 depicts a flowchart according to embodiments disclosed in this patent document.

FIG. 6 depicts a flowchart according to embodiments disclosed in this patent document. FIG. 6 shows a flowchart of request message handling 600 when a request may be either satisfied or dropped.

FIG. 6 shows a start 610. An originator node sets up a rule or rules regarding selecting resources (i.e., an intelligent distribution function) 620. Initially, the originator node sends out a resource request to neighbor nodes per the intelligent distribution function 630. The originator node may send out the request as described above with respect to FIGS. 2 and 3. The request message is received by one or more receiving nodes. Each receiving node analyzes whether it can satisfy the request 640. If it cannot satisfy the request, the receiving node determines whether it should forward the request per the intelligent distribution function 660. If the intelligent distribution function indicates the request should not be forwarded, then the receiving node drops the resource request 670 and ends 680. If the intelligent distribution function indicates that the request should be forwarded, then the receiving node sends out the resource request to neighbor node or nodes per the rules in the intelligent distribution function 630. This loop of box 630, 640, and 660 continues until the intelligent distribution function indicates the request should be dropped or until a receiving node can satisfy the request for resources 640.

If the receiving node can satisfy the request for resources, then the receiving node becomes the fulfilling node and configures resources and sends a response back to the originator node via the requestor node pathway 650 and ends 680.

Figure 7:
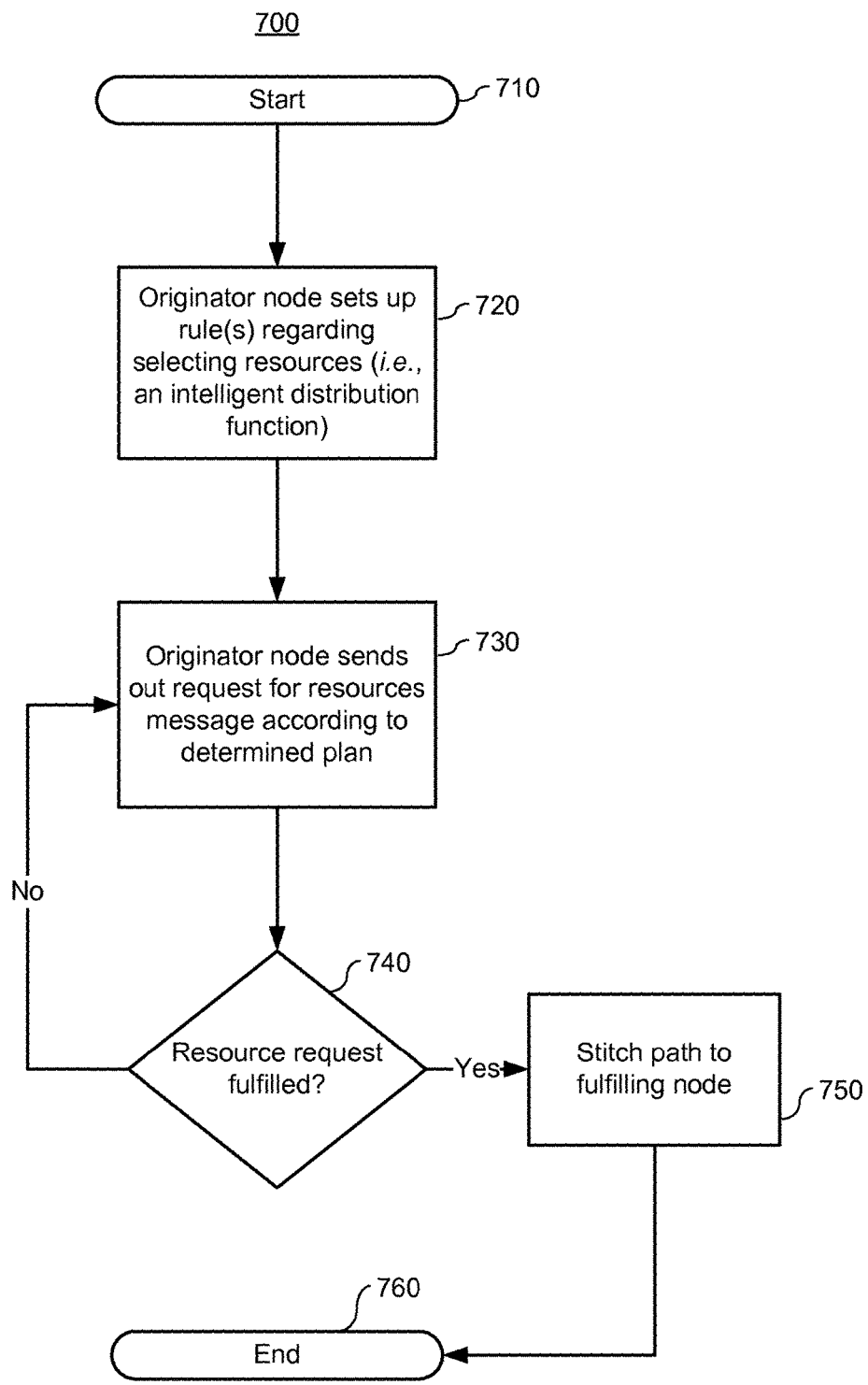
FIG. 7 depicts a flowchart of autonomous resource discovery, management, and stitching according to embodiments disclosed in this patent document.

FIG. 7 depicts a flowchart of autonomous resource discovery, management, and stitching according to embodiments disclosed in this patent document. FIG. 7 illustrates a flowchart of originator node analytics 700 to determine a plan for sending out a request message. In some embodiments, the originating node sends out a request message to all neighbors. However, in other embodiments, the originating node limits the direction, propagation, or path of the request message. These limitations can be performed by the originating node by determining a plan for sending out the request. The plan can be limiting the direction, limiting the number of tokens, limiting the hop count, limiting the bandwidth, limiting the latency, or any other plan that limits the propagation path other than sending the request message to all neighbors to potentially forward to all neighbors, etc.

FIG. 7 shows a start 710 and an originator node setting up a rule or rules regarding selecting resources, i.e., establishing an intelligent distribution function 720. The originator node sends out the request for resources according to a determined plan 730. As described above, the determined plan may be to search for available resources only in the originating node's neighbors, only within a hop count of two, only in a particular direction, or any other determined plan. The originator node checks to see if it receives a fulfillment response back from a fulfilling node 740. If there is not a fulfillment, then the originator node may determine a new plan 730. The new plan may be extending beyond neighbors or increasing the hop count limit by one or more. The loop of determining a new plan and checking for fulfillment continues until the resource request can be fulfilled. Once the resource request is fulfilled, the originating node stitches a path to the fulfilling node 750 and ends 760.

Figure 8:
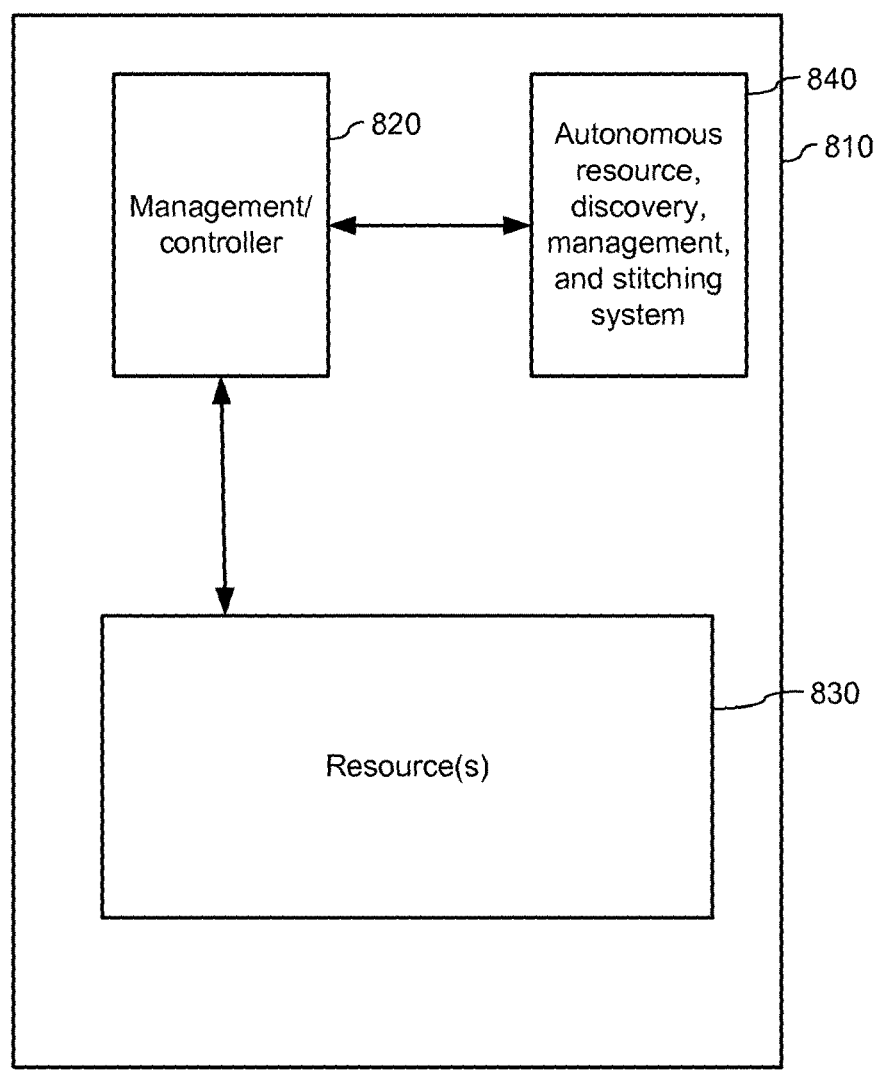
FIG. 8 depicts a block diagram of a node in an autonomous resource discovery, management, and stitching system according to embodiments disclosed in this patent document.

FIG. 8 depicts a block diagram of a node in an autonomous resource discovery, management, and stitching system according to embodiments disclosed in this patent document. The node 800 shown in FIG. 8 includes a management/controller 820, an autonomous resource discovery, management, and stitching system 840, and at least one resource 830. In some embodiments, the resource or resources may include and not limited to compute, storage, networking, file system, individual files, capabilities of devices, sensors, services, database, smart grid, power management, power charging, sensors, electric vehicles, or any other resource. Non-compute systems that have a compute system as a way for resource control may also be included. For example, a non-compute system that has a compute system as a way for resource control includes an amount of cubic space remaining in a shipping container, destination, time-to-destination, refrigerate-or-not etc. are all parameters of a resource, which is the space in a shipping container.

In some embodiments management/controller 820 may be any sort of controller managing the node. In some embodiments, management/controller 820 is an OpenStack controller running on a switch, a VMWare based cloud, Microsoft Azure or any cloud framework. For ease of explanation, OpenStack will be used herein to refer to any cloud framework.

In some embodiments, autonomous resource discovery, management, and stitching system 840 is implemented in software executing on a controller or processor, cooperating with management/controller 820 to perform resource control and management. In other embodiments, autonomous resource discovery, management, and stitching system 840 is implemented in hardware, for example, in a processor or a field programmable gate array (FPGA) or ASIC(s), programmable arrays, digital signal processing circuitry, or the like. In some embodiments, autonomous resource discovery, management, and stitching system 840 may retrieve information from OpenStack and assign resources via OpenStack.

In some embodiments, autonomous resource discovery, management, and stitching system 840 has the knowledge of all the interfaces on the node 810 and communicates with other autonomous resource discovery, management, and stitching systems of other nodes via these interfaces to share resource information. In some embodiments, a plurality of nodes 810 are connected to each other. Thereby eliminating a central management and instead having a distributed management of the entire network through the autonomous resource discovery, management, and stitching systems. Using an autonomous, distributed management system, there are many advantages, including scalability since more nodes may be added to the system to increase the number of nodes and therefore, resources, without limitation.

The nodes each have their own management/controller and are managed independently of each other. Two nodes do not have to have the same type of management or be running the same version of software. The network is also decentralized such that one node does not control or manage any other node. As such, no node has any visibility into available resources or management of any other node.

One advantage of using autonomous resource discovery, management, and stitching system 840 is its ability to seek out resources in a heterogeneous network environment, where there are multiple nodes that may have different management software. Each node can have a different environment and each environment can have different versions of the same software or different software. Upgrades are easier because each environment can be managed differently and independently of the other nodes. Interoperability is greatly enhanced and simplified.

Figure 9:
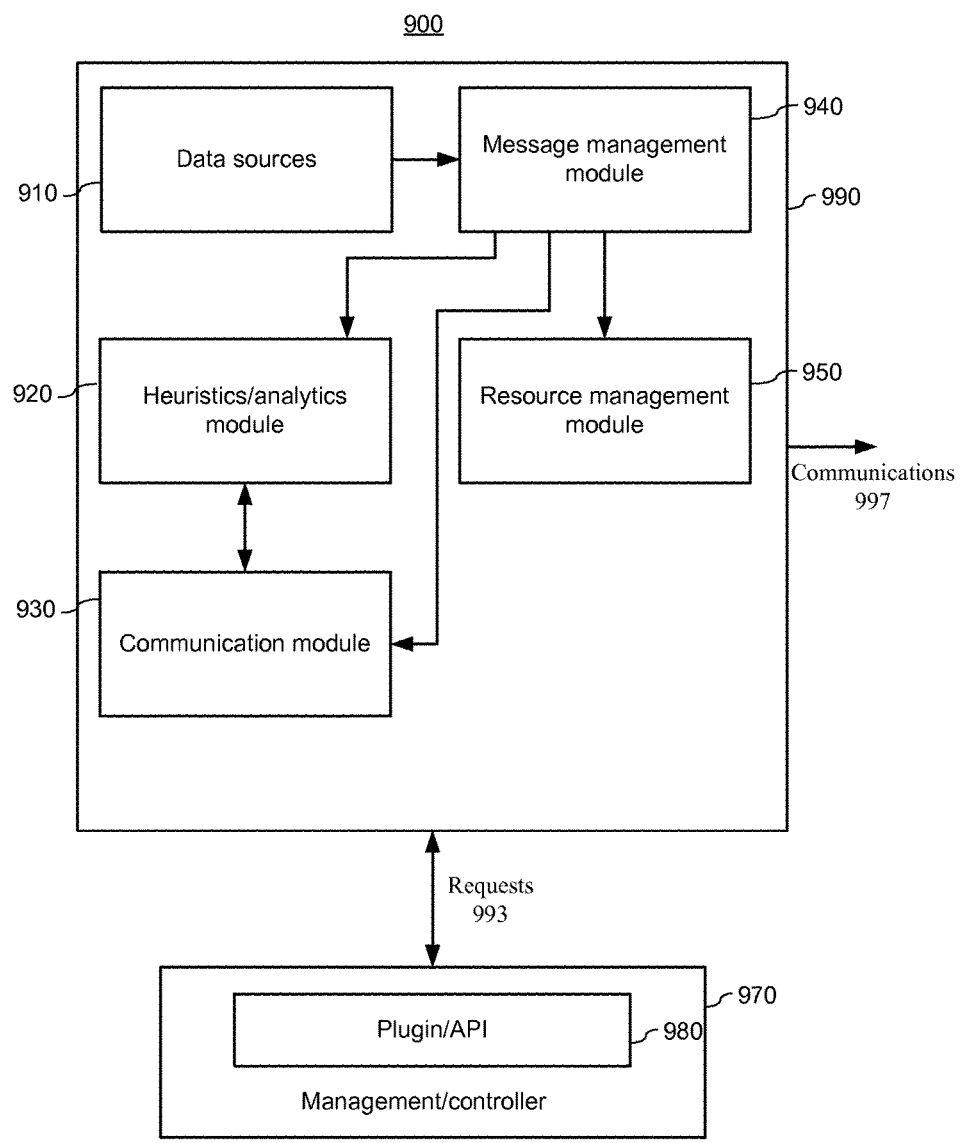
FIG. 9 depicts a block diagram of an autonomous resource discovery, management, and stitching system according to embodiments disclosed in this patent document.

FIG. 9 depicts a block diagram of an autonomous resource discovery, management, and stitching system according to embodiments disclosed in this patent document. FIG. 9 depicts an autonomous resource discovery, management, and stitching system 900. FIG. 9 shows modular components of the autonomous resource discovery, management, and stitching system shown in FIG. 8 as 840. FIG. 9 includes data sources 910, message management module 940, heuristics/analytics module 920, resource management module 950, and communication module 930.

In some embodiments, data sources 910 includes an event table, request status table, weighted forwarding table, and configuration information including information about the network. The event table and request status table may be tables that include information stored in the various logs described in reference to FIG. 2. The tables may be stored in any kind of persistent storage on the node, for example, solid state storage, memory, a hard disk, a random access memory (RAM), or any other kind of storage accessible for reading and writing by the node. The weighted forwarding table may be used to determine a forwarding path of a request message. The weighted forwarding table may also be stored in any kind of persistent storage on the node, for example, solid state storage, memory, a hard disk, a random access memory (RAM), or any other kind of storage accessible for reading and writing by the node.

The tables may have a temporal limitation on the storage of the data in the tables. For example, in some embodiments, the tables store event and forwarding data from the past two hours. In other embodiments, the tables store data from a longer or shorter time period. In some embodiments, the data stored in the table is transferred to the heuristics/analytics module to factor into the analytics for determining a plan to send out a request message. For example, data related to successes over time at a particular time of day may be used to determine a plan for sending out a message at a particular time of day.

In some embodiments, the heuristics/analytics module 920 includes a forward weights calculation, forward direction calculation, and reply direction calculation. The heuristics/analytics module 920 may use an algorithm for an originating node to send a request message out as described in FIG. 2. In some embodiments, machine learning algorithms are used to create those heuristics.

The heuristics/analytics module 920 may also be used by the receiving node(s) to forward request messages and reply messages. The heuristics/analytics module 920 may be implemented as software executing on a processor and accessing storage. In other embodiments, the heuristics/analytics module 920 may be implemented in hardware.

The communication module 930 handles message communication. It may be implemented as software may be implemented on as software executing on a processor and accessing storage. In other embodiments, the communications module 930 may be implemented in hardware.

The message management module 940 is further described below with reference to FIG. 11. The resource management module 950 is further described below with reference to FIG. 10.

FIG. 9 may be used to illustrate a message flow through an autonomous resource discovery, management, and stitching system in a node. A request 993 comes into the autonomous resource discovery, management, and stitching system 990 via the management/controller 970 running plugin 980. The request is handled by the message management module 940. The message management module is coupled to the heuristics/analytics module 920, the communication module 930, and the resource management module 950. The communication module 930 is coupled to the heuristics/analytics module 920. The communication module 930 communicates the message out 997.

Figure 10:
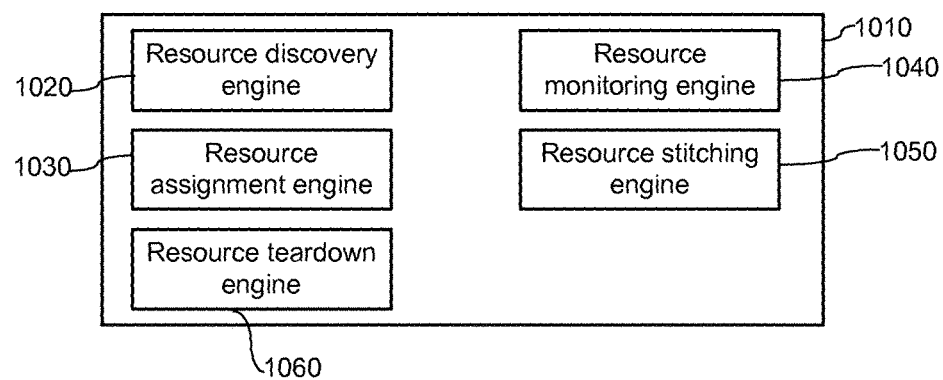
FIG. 10 depicts a block diagram of a resource management module in an autonomous resource discovery, management, and stitching system according to embodiments disclosed in this patent document.

FIG. 10 depicts a block diagram of a resource management module in an autonomous resource discovery, management, and stitching system according to embodiments disclosed in this patent document.

FIG. 10 shows a resource management module 1010 in an autonomous resource discovery, management, and stitching system. In some embodiments, resource management module 1010 includes resource discovery engine 1020, resource assignment engine 1030, resource monitoring engine 1040, resource stitching engine 1050, and resource teardown engine 1060. In some embodiments, resource management module 1010 executes on a switch in a data center.

Resource discovery engine 1020 may discover resources. When autonomous resource discovery, management, and stitching system 840 receives a resource request from a user, an application, or another node, autonomous resource discovery, management, and stitching system 840 checks the local node to see if the resource requested is available. If the local node's resources can meet the requirements of the request, then the discovery process ends and autonomous resource discovery, management, and stitching system 840 proceeds with resource assignment similar to the embodiment of central management. If no available resources or insufficient resources are available at the local node, discovery engine 1020 may send out discovery messages over at least one available interface to seek requested resources from other nodes, as described above in reference to FIG. 2. When a receiving node receives an incoming discovery message, the receiving node may forward the message; reply to the message, depending on if there are available resources in its block satisfying the request included in the message; or drop the message. A discovery message may have a timeout value or hop limit value. This timeout or hop limit allows unnecessary broadcast storms, or a distributed denial of service (DDoS).

Once a node has become a fulfilling node, resource assignment engine 1030 may be used to assign resources. A reply may also be sent back to the requesting node. Assigned resources may have associated timeout values for the purpose of determining if they are used or not. If the resource is not used, the assignment may timeout.

In some embodiments, resource monitoring engine 1040 involves monitoring available resources and assigned resources in a local node. Information of available resources may be used by resource discovery engine 1020. Information of assigned resources may be used for determining if the resources are used or not. If the resources are not used and keep idling beyond the timeout value, resource management module 1010 may call resource teardown 1060 to release resources.

Resource stitching engine 1050 may be used for networking stitching between resources assigned across multiple nodes. Once an originating node assigns a resource at a fulfilling node, the fulfilling node will reply that to the receiving node, including the stitching information, e.g., a network identifier or virtual extensible local area network identifier (VNI or VxLAN ID). After the originating node receives the reply, the originating node may assign any necessary resources according to the stitching information. After stitching, seamless resource access and control may be achieved. In some embodiments, the resources assigned from fulfilling nodes appear as resources from the originating node, from the perspective of the originating node.

If there is an incoming request to release assigned resources, resource management module 1010 calls resource teardown engine 1060. If all resources only reside at the local node, teardown is direct. If there exists any fulfilling nodes, a teardown message including the resource information may be sent out towards the fulfilling block via the forwarding nodes. Once the fulfilling node receives the teardown request, the corresponding resources may be deleted and released. In embodiments of the present invention, an originating node assigns resources for an incoming request. However, if the resources keep idling beyond the timeout checking by resource monitoring engine 1040, determines the assigned resources are not used by the originating node. Thus, resource management module 1010 may call resource teardown engine 1060 to release the resources.

Figure 11:
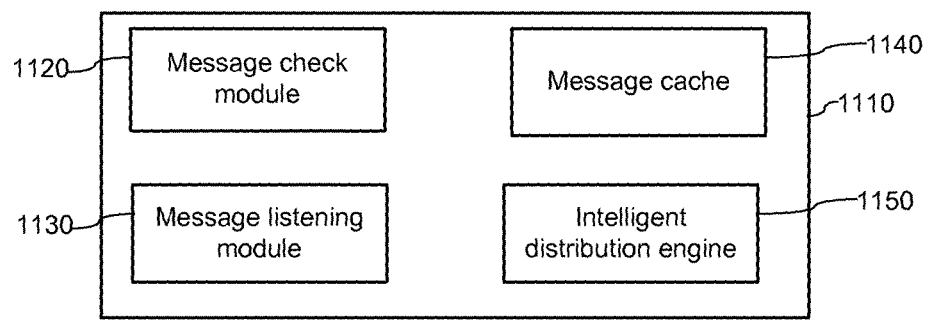
FIG. 11 depicts a block diagram of a message management module in an autonomous resource discovery, management, and stitching system according to embodiments disclosed in this patent document.

FIG. 11 depicts a block diagram of a message management module in an autonomous resource discovery, management, and stitching system according to embodiments disclosed in this patent document. Message management module 1110 comprises message check module 1120, message listening module 1130, message cache 1140, and intelligent distribution engine 1150. Message listening module 1120 listens for incoming messages and caches them in message cache 1140. Message cache 1140 may be any storage for example any kind of persistent storage on the node, for example, solid state storage, memory, a hard disk, a random access memory (RAM), or any other kind of storage accessible for reading and writing by the node. Message check 1130 checks the message including the message type and content.

Intelligent distribution engine 1150 executes the intelligent distribution function. In some embodiments, an intelligent distribution function is used to set rules for request message propagation. An intelligent distribution function is a set of rules that specifies how the message propagates. For example, an intelligent distribution function may implement a set of rules for dropping a request for resources and a set of rules for selection from among more than one response that the resource request can be fulfilled. An intelligent distribution function may be implemented in the intelligent distribution engine 1150.

In some embodiments, the intelligent distribution function is set by the originating node. The intelligent distribution function may be used to implement a set of rules for dropping a request for resources. In some embodiments, an originating node may include certain parameters for its request message. For example, the originating node may set a hop count limit, bandwidth limit, or latency limit associated with the resource request. The originating node may send the request to neighbor nodes in accordance with a determined plan. Each receiving node may reply that it can satisfy the request, forward the request, or drop the request after checking the parameters set with the request.

In some embodiments, intelligent distribution engine 1150 is implemented in software executing on a controller or processor. In other embodiments, intelligent distribution engine 1150 is implemented in hardware, for example, in a processor or a field programmable gate array (FPGA) or ASIC(s), programmable arrays, digital signal processing circuitry, or the like.

One advantage of the invention disclosed herein is that it provides a distributed, scalable, autonomous resource discovery, management, and stitching system that is capable of near infinite scalability.

Another advantage of the invention disclosed herein is that the management process is simplified and more reliable since one central management system is not managing a large number of racks.

Yet another advantage of the invention disclosed herein is that it addresses the problem of scalability in cloud environments.

Yet another advantage of the invention disclosed herein is that it provides systems and methods to dynamically increase the system resources leveraging the resource available on remote instances.

One of ordinary skill in the art will appreciate that various benefits are available as a result of the present invention.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, application, and variations will be apparent in light of the foregoing description. Thus, the inventions described herein are intended to embrace all such alternatives, modifications, applications and variations as may fall within the spirit and scope of the appended claims.

What is claimed is:

1. A method for an originating node to facilitate using a resource at a fulfilling node in a decentralized network of nodes, the method comprising:
    sending to a node in the decentralized network a request message for the resource for use by or on behalf of the originating node, the request message comprising:
        a description of the resource requested by the originating node, the node being communicatively coupled to the originating node; and
        one or more intelligent distribution instructions determined by the originating node using an analytics module to determine, at least in part, the one or more intelligent distribution instructions for propagating the request message, the one or more intelligent distribution instructions setting forth: (1) one or more conditions regarding propagation of the request message by a receiving node that receives the request message, including a timeout period such that the request message times out and is dropped after a predetermined amount of time has passed, and (2) one or more conditions for responding to the request message, one or more conditions for handling receipt of one or more responses from nodes that received the request message and have the resource requested by the originating node available for use by or on behalf of the originating node, or both;
    receiving a reply message from a neighbor node, the reply message comprising:
        a message that the fulfilling node can satisfy the request message;
        network identifier information from the fulfilling node; and
        network identifier information indicating a path between the originating node and the fulfilling node; and
    stitching the path from the originating node to the fulfilling node using the network identifier information received with the reply message.

2. The method of claim 1 wherein the network identifier information includes information related to the fulfilling node and a forwarding node.

3. The method of claim 1 wherein the one or more intelligent distribution instructions limit propagation of the request message through the decentralized network of nodes.

4. The method of claim 1 wherein the one or more intelligent distribution instructions are set by the originating node based upon a determined plan.

5. The method of claim 4 wherein the determined plan uses the one or more intelligent distribution instructions to limit a number of hops in the network.

6. The method of claim 4 wherein the determined plan is based on an analysis of historical performance.

7. A method for using a receiving node in a decentralized network of nodes, where an originating node requests use of a resource at a fulfilling node, the method comprising
    receiving, from a first neighbor node in the network, a request message, the request message comprising a description of the resource requested and one or more intelligent distribution instructions determined by the originating node using an analytics module to determine, at least in part, the intelligent distribution instructions for propagating the request message, the intelligent distribution instructions setting forth: (1) one or more conditions regarding propagation of the request message, including a timeout period such that the request message times out and is dropped after a predetermined amount of time has passed and (2) one or more conditions for responding to the request message, one or more conditions for handling receipt of one or more responses from nodes that received the request message and have the resource requested by the originating node available for use by or on behalf of the originating node, or both;

determining whether the resource is available at the receiving node by evaluating available resources at the receiving node, the receiving node and the first neighbor node having independent resource management; and forwarding the request message to a second neighbor node, responsive to the resource being unavailable at the receiving node and the forwarding satisfying the one or more intelligent distribution instructions, the receiving node and the second neighbor node having independent resource management.

8. The method of claim 7 further comprising passing a reply message from the second neighbor node to the first neighbor node, the reply message indicating a node can satisfy the request message.

9. The method of claim 7 further comprising:
generating a reply message indicating that the receiving node can satisfy the request for the resource; and
sending the reply message to the first neighbor node.

10. The method of claim 7 further comprising dropping the request message based on a lapse of the timeout period identified by the one or more intelligent distribution instructions.

11. A distributed, scalable, autonomous resource discovery, management, and stitching system, comprising:
a plurality of independently managed nodes, each node comprising;
at least one resource;
a controller that manages the at least one resource; and
an autonomous resource, discovery, management, and stitching system that interfaces with the autonomous resource, discovery, management and stitching system on another node, the autonomous resource, discovery, management and stitching system comprising:
a resource discovery engine that searches within the at least one resource responsive to a resource request message;
a resource assignment engine, operating in conjunction with the resource discovery engine, that assigns a discovered resource responsive to the resource request message;
an analytics module, which operates in conjunction with an intelligent distribution engine, that determines, at least in part, one or more instructions regarding propagation of the resource request message;
the intelligent distribution engine, operating in conjunction with the analytics module, that sets forth the one or more instructions regarding propagation of the resource request message, including a timeout period such that the resource request message times out and is dropped after a predetermined amount of time has passed; and
a resource stitching engine that stitches the discovered resource between at least two nodes.

12. The system of claim 11 wherein the intelligent distribution engine establishes a ranking of at least two available discovered resources.

13. The system of claim 11 further comprising a resource teardown engine, operating in conjunction with the resource assignment engine, the resource teardown engine releases the discovered resource.

14. The method of claim 1 wherein the one or more intelligent distribution instructions comprise a set of one or more rules regarding selecting from among more than one response from responding nodes indicating that each of the responding nodes can fulfill the request for the resource.

15. The method of claim 6 wherein the historical performance comprises stored information about successful fulfillment of one or more prior request messages sent by the originating node.

16. The method of claim 7 wherein the one or more intelligent distribution instructions comprise a set of one or more rules regarding selecting from among more than one response from nodes indicating that each of the nodes can fulfill the request for the resource.

17. The method of claim 7 wherein at least some of the one or more intelligent distribution instructions are based, at least in part, on an analysis of historical performance.

18. The system of claim 11 wherein at least one of the one or more instructions comprises a set of one or more rules regarding selecting from among more than one response from responding nodes indicating that each of the responding nodes can fulfill the request for the resource.

19. The method of claim 1 further comprising the steps of:
receiving a request for the resource at the originating node; and
responsive to the originating node not currently having the resource available for use at the originating node, generating the request message.

* * * * *